US012703491B2

(12) United States Patent
Ching et al.

(10) Patent No.: US 12,703,491 B2
(45) Date of Patent: Aug. 11, 2026

(54) COMPOSITE AIRCRAFT COMPONENT WITH EMBEDDED PIEZOELECTRIC ICE PROTECTION

(71) Applicant: Goodrich Corporation, Charlotte, NC (US)

(72) Inventors: Nathaniel Ching, Hartville, OH (US); Sugumaran Selvaraj, Bangalore (IN); Rhushikesh Patil, Bangalore (IN); Jin Hu, Cary, NC (US); Galdemir C. Botura, Copley, OH (US); Shyam Kumar Dattatri, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/755,979

(22) Filed: Jun. 27, 2024

(65) Prior Publication Data

US 2025/0242926 A1 Jul. 31, 2025

(30) Foreign Application Priority Data

Jan. 29, 2024 (IN) ............................ 202411005684

(51) Int. Cl.
*B64D 15/12* (2006.01)
*B64D 15/20* (2006.01)

(52) U.S. Cl.
CPC ............. *B64D 15/12* (2013.01); *B64D 15/20* (2013.01)

(58) Field of Classification Search
CPC .................................................... B64D 15/163
See application file for complete search history.

(56) References Cited

U.S. PATENT DOCUMENTS 4,545,553 A * 10/1985 Finke ..................... H10N 30/50 310/317
4,732,351 A * 3/1988 Bird ..................... B64D 15/163 244/134 F
5,172,024 A * 12/1992 Broussoux ................ B08B 7/02 310/322

(Continued)

FOREIGN PATENT DOCUMENTS

CN 102490905 A * 6/2012
CN 206935952 U 1/2018

(Continued)

OTHER PUBLICATIONS

English translation of CN102490905 (Year: 2012).*

(Continued)

*Primary Examiner* — Joshua J Michener
*Assistant Examiner* — Michael B. Kreiner
(74) *Attorney, Agent, or Firm* — CANTOR COLBURN LLP

(57) ABSTRACT

Aircraft ice protection systems and methods include an aircraft component having an internal layer and an external layer, a piezoelectric actuator element embedded within the aircraft component between material of the internal layer and the external layer, and a control system operably connected to the piezoelectric actuator element and configured to drive actuation of the piezoelectric actuator element to at least one of remove ice formed on the aircraft component and prevent the formation of ice on the aircraft component.

20 Claims, 9 Drawing Sheets

(56) References Cited

U.S. PATENT DOCUMENTS 5,206,806 A * 4/1993 Gerardi ............... G01M 5/0016 244/134 F
5,590,854 A * 1/1997 Shatz ................... B64D 15/163 244/209
6,162,313 A 12/2000 Bansemir et al.
8,793,970 B2 * 8/2014 Le Docte ............... B64D 33/02 60/39.093
8,888,047 B2 * 11/2014 Chuc ..................... B06B 1/0622 310/334
9,155,430 B2 * 10/2015 Hertzberg .............. B64D 15/20
9,327,839 B2 * 5/2016 Giles ......................... B64C 3/00
9,555,894 B2 * 1/2017 Botura ................... B64D 15/22
11,220,328 B2 1/2022 Storm et al.
11,371,433 B2 * 6/2022 Saripella ................... B32B 5/12
11,492,128 B2 * 11/2022 Gonidec ................ B64D 15/22
2004/0197534 A1 * 10/2004 Miller ..................... B32B 27/32 428/196
2013/0043342 A1 * 2/2013 Nordin ................... H05B 3/145 244/1 A
2016/0114883 A1 4/2016 Guerry et al.
2018/0037329 A1 2/2018 Giles et al.
2022/0396361 A1 * 12/2022 Botura ................. B64D 15/163
2023/0242261 A1 8/2023 Lou-Moeller et al.
2023/0249834 A1 * 8/2023 Botura ................... B64D 15/16 244/134 R
2023/0365265 A1 * 11/2023 Bourhis ................. B64D 15/16

FOREIGN PATENT DOCUMENTS

CN 106828873 B * 10/2018 ............... B64C 3/00
CN 109436338 A 3/2019
CN 213566509 U 6/2021
EP 4501789 A1 2/2025

OTHER PUBLICATIONS

English translation of CN106828873 (Year: 2018).*
Extended European Search Report for EP Application No. 25154247.8, dated Jul. 4, 2025, pp. 1-10.

* cited by examiner 700
704
708
710
716
712
710
706
714
706
714
706
702
712

COMPOSITE AIRCRAFT COMPONENT WITH EMBEDDED PIEZOELECTRIC ICE PROTECTION

CROSS-REFERENCE TO RELATED APPLICATIONS

This application claims the benefit of Indian Provisional Patent Application No. 202411005684 filed Jan. 29, 2024, the disclosure of which is incorporated herein by reference in its entirety.

BACKGROUND

The subject matter disclosed herein generally relates to ice protection systems and, more particularly, to aircraft ice protection systems having piezoelectric ice protection embedded within a composite aircraft component.

Aircraft require de-icing and/or ice protection to prevent the build up of ice on external surfaces of the aircraft, including flight control surfaces (e.g., flaps, slats, ailerons, rudders, spoilers, etc.), wing structures, and/or fuselage structures. During flight, an aircraft may be subject to conditions wherein ice accumulates on component surfaces of the aircraft such as wings, struts, airfoils, etc. If unchecked, such accumulations can laden the aircraft with additional weight and may alter configurations of the wings and/or control surfaces of the aircraft in a detrimental fashion. Efforts to prevent and/or remove such accumulations of ice under flying conditions has resulted in three generally universal approaches to removal of accumulated ice, a process known generally as de-icing.

One process is thermal de-icing, wherein portions of an airfoil, such as a leading edge, are heated to loosen adhesive forces between accumulating ice and the aircraft component. Once loosened by thermal conditions, the ice can be blown from the aircraft component by the airstream passing over the aircraft. Another process for de-icing involves chemicals. A chemical can be applied or supplied to all or part of an aircraft to depress adhesion forces associated with ice accumulation upon the aircraft or to depress the freezing point of water collecting upon surfaces of the aircraft. The third method is termed mechanical de-icing. Mechanical de-icing may employ various mechanisms such as electromechanical hammering, overlapping flexible ribbon conductors employing an electrorepulsive force between conductors, and pneumatic de-icing. Improved de-icing systems and ice protection systems may improve efficiencies, save on weight, reduce electrical power and/or bleed air consumption, and provide other benefits and features, as described herein.

SUMMARY

According to some embodiments, aircraft ice protection systems are provided. The aircraft ice protection systems include an aircraft component having an internal layer and an external layer, a piezoelectric actuator element embedded within the aircraft component between material of the internal layer and the external layer, and a control system operably connected to the piezoelectric actuator element and configured to drive actuation of the piezoelectric actuator element to at least one of remove ice formed on the aircraft component and prevent the formation of ice on the aircraft component.

In addition to one or more of the features described herein, or as an alternative, further embodiments of the aircraft ice protection systems may include that the piezoelectric actuator element is part of an array of piezoelectric actuator elements embedded within the aircraft component In addition to one or more of the features described herein, or as an alternative, further embodiments of the aircraft ice protection systems may include that the piezoelectric actuator element comprises a hole, wherein material of the internal layer and material of the external layer are bonded together through the hole.

In addition to one or more of the features described herein, or as an alternative, further embodiments of the aircraft ice protection systems may include that the piezoelectric actuator element comprises a hole and the aircraft component comprises a hole, wherein the hole of the piezoelectric actuator element and the hole of the aircraft component are aligned.

In addition to one or more of the features described herein, or as an alternative, further embodiments of the aircraft ice protection systems may include that the hole of the piezoelectric actuator element is larger than the hole of the aircraft component.

In addition to one or more of the features described herein, or as an alternative, further embodiments of the aircraft ice protection systems may include that material of the internal layer and material of the external layer are bonded together around the hole in the piezoelectric actuator element.

In addition to one or more of the features described herein, or as an alternative, further embodiments of the aircraft ice protection systems may include at least one ice detection sensor associated with the aircraft component, wherein the control system is configured to cause actuation of the piezoelectric actuator element in response to information received from the at least one ice detection sensor.

In addition to one or more of the features described herein, or as an alternative, further embodiments of the aircraft ice protection systems may include that the control system comprises a controller and a power module.

In addition to one or more of the features described herein, or as an alternative, further embodiments of the aircraft ice protection systems may include that the controller is configured to control actuation of the piezoelectric actuator element by controlling the power module to send electrical power to the piezoelectric actuator element.

In addition to one or more of the features described herein, or as an alternative, further embodiments of the aircraft ice protection systems may include that a supply of power from the power module to the piezoelectric actuator element is set to a predetermined frequency operation to induce vibrations in the piezoelectric actuator element.

In addition to one or more of the features described herein, or as an alternative, further embodiments of the aircraft ice protection systems may include that the predetermined frequency operation comprises supplying power to the piezoelectric actuator element having a frequency of 20 kHz and 60 kHz.

In addition to one or more of the features described herein, or as an alternative, further embodiments of the aircraft ice protection systems may include that the predetermined frequency operation comprises supplying power to the piezoelectric actuator element with a sweeping operation through a range of frequencies.

In addition to one or more of the features described herein, or as an alternative, further embodiments of the aircraft ice protection systems may include that the range of frequencies is 10 Hz to 5,000 Hz.

In addition to one or more of the features described herein, or as an alternative, further embodiments of the aircraft ice protection systems may include that the power module comprises an input protection module and a boost module, wherein the input protection module and the boost module are configured to condition an input of electrical power received from an aircraft power supply.

In addition to one or more of the features described herein, or as an alternative, further embodiments of the aircraft ice protection systems may include that the input electrical power is 28 V DC to 800 V DC or 110 V AC to 240 V AC and the power module is configured to boost a voltage of the electrical power to between 200 V and 1,500 V.

In addition to one or more of the features described herein, or as an alternative, further embodiments of the aircraft ice protection systems may include one or both of (i) a heater element arranged in or on the aircraft component and (ii) a low ice adhesive coating or surface modification applied to the external layer of the aircraft component.

In addition to one or more of the features described herein, or as an alternative, further embodiments of the aircraft ice protection systems may include that the aircraft component is a first aircraft component and the piezoelectric actuator element is a first piezoelectric actuator element associated with the first aircraft component, the aircraft ice protection system further including a second aircraft component having an associated second piezoelectric actuator element embedded within the second aircraft component.

In addition to one or more of the features described herein, or as an alternative, further embodiments of the aircraft ice protection systems may include that the control system is configured to selectively control actuation of the first piezoelectric actuator element and the second piezoelectric actuator element.

In addition to one or more of the features described herein, or as an alternative, further embodiments of the aircraft ice protection systems may include that the control system is configured to drive operation of the piezoelectric actuator element for a predetermined amount of time.

According to some embodiments, methods of aircraft ice protections are provided. The methods include embedding a piezoelectric actuator element within an aircraft component, wherein the aircraft component comprises an internal layer and an external layer and the piezoelectric actuator element is embedded between material of the internal layer and the external layer, detecting an ice formation condition associated with the aircraft component, and driving actuation of the piezoelectric actuator element to induce vibrations within the aircraft component.

In addition to one or more of the features described herein, or as an alternative, further embodiments of the methods may include that embedding the piezoelectric actuator element within the aircraft component includes forming a structure of the internal layer, forming a structure of the external layer, arranging the piezoelectric actuator element between the structure of the internal layer and the structure of the external layer, and bonding material of the internal layer to material of the external layer, with the piezoelectric actuator element embedded within and between material of the internal layer and the external layer.

In addition to one or more of the features described herein, or as an alternative, further embodiments of the methods may include that embedding the piezoelectric actuator element within the aircraft component includes forming the internal layer and the external layer as a unitary structure with the piezoelectric actuator element disposed within the material of the unitary structure.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
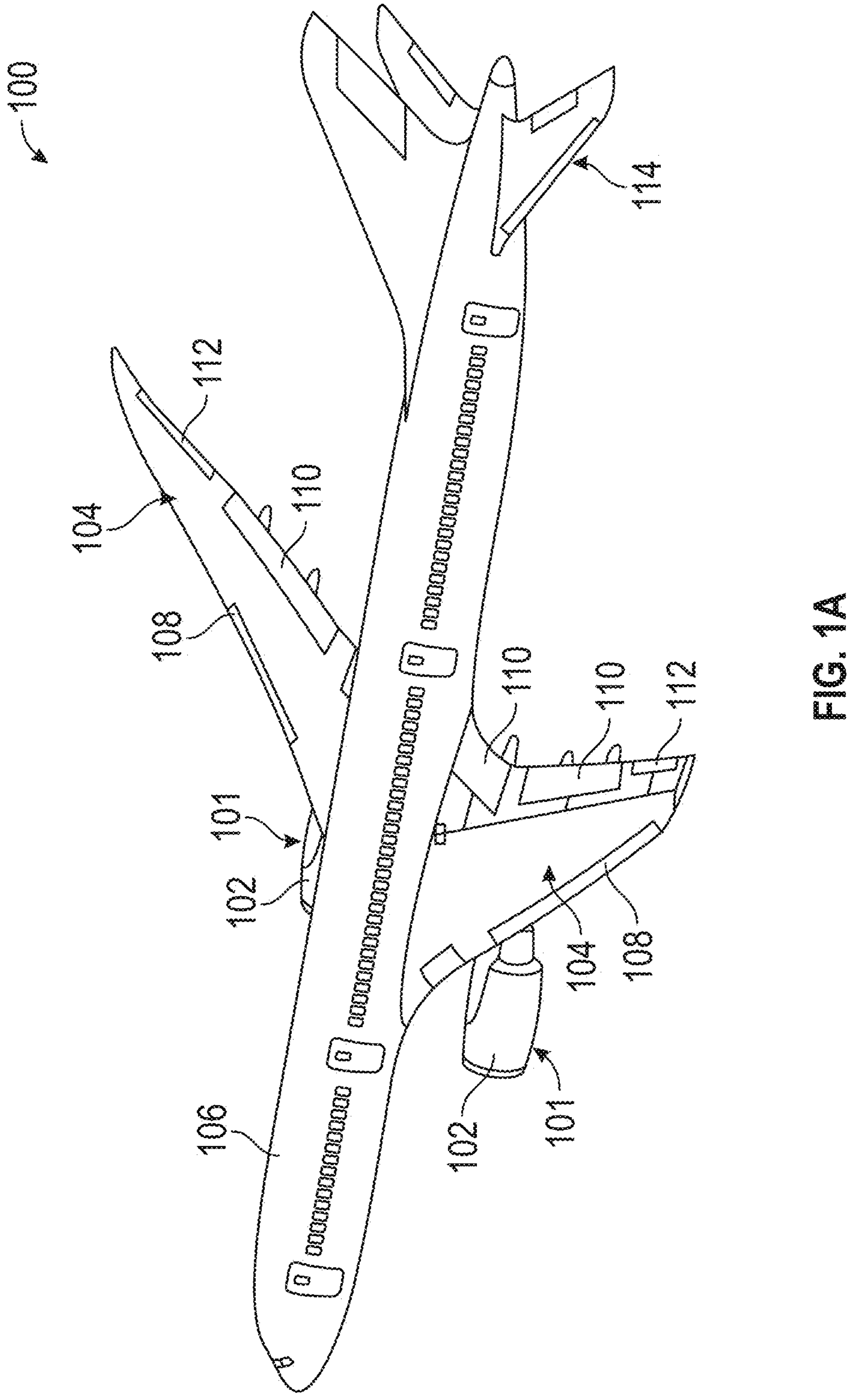
FIG. 1A is a schematic illustration of an aircraft incorporating embodiments of an ice protection system in accordance with the present disclosure.

FIG. 1A illustrates an example of an aircraft 100 having aircraft engines 101 surrounded by (or otherwise carried in) nacelles 102. The aircraft 100 includes wings 104 that extend from an aircraft fuselage 106. Each wing 104 may include one or more slats 108 on a forward edge or leading edge and one or more flaps 110 on an aft, rear, or trailing edge thereof. The wings 104 may also include ailerons 112 on the trailing edges as well as spoilers, as will be appreciated by those of skill in the art. The aircraft 100, as shown, includes a tail structure 114 which can include rudders, trim tabs, and the like, as will be appreciated by those of skill in the art. The flaps, slats, ailerons, and the like are generally referred to herein as "aircraft flight control elements" as they are movable under aircraft power systems and are configured to control flight and motion of the aircraft 100. The aircraft flight control elements 108, 110, 112, etc., the wings 104, the nacelles 102, the tail structure 114 and/or other parts of the aircraft fuselage 106 may have ice build up during operation (e.g., in cold temperature environments and/or during flight). To prevent and/or remove any ice build up, the aircraft 100 may include an ice protection system, which can include heaters, pneumatic systems, chemical systems, or the like, as will be appreciated by those of skill in the art.

Figure 1B:
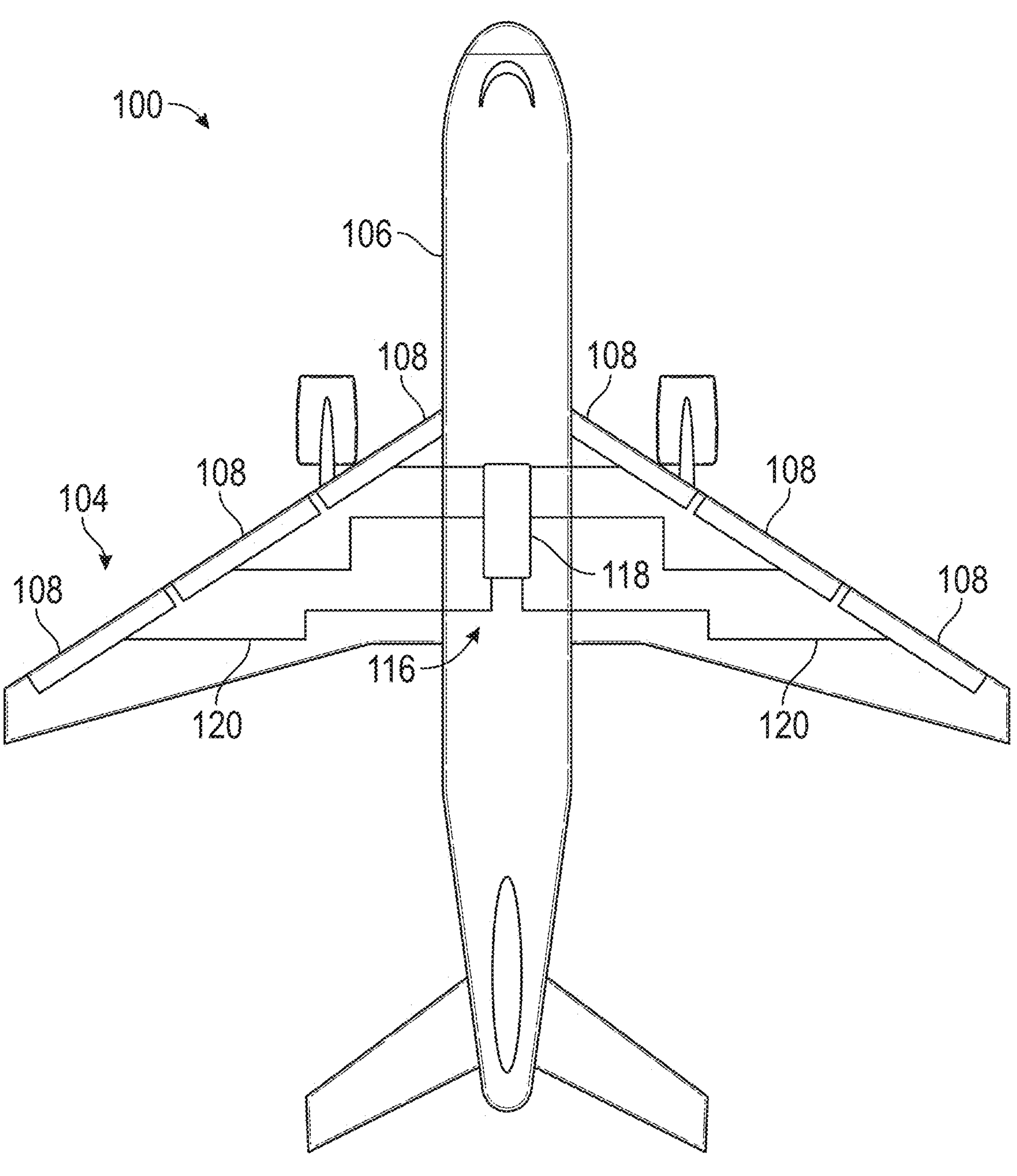
FIG. 1B is a plan view schematic illustration of the aircraft of FIG. 1A illustrating a portion of an ice protection system installed thereon.

For example, with respect to FIG. 1B, a schematic illustration of a portion of an ice protection system 116 in accordance with an embodiment of the present disclosure as installed on the aircraft 100 is shown. The ice protection system 116 is configured to supply a deicing command and power from a control system 118 through connection lines 120 to various structures and/or components of the aircraft 100 to enable a de-icing operation and/or provide warm air to prevent ice accretion and/or build up on the structures and/or components. In illustrative FIG. 1B, aircraft flight control elements 108 are shown on the leading edge of the wings 104 only, and the other aircraft flight control elements (e.g., elements 110, 112, etc.) are not shown for clarity and ease of description. However, it will be appreciated that the connection lines 120 may be connected to various other components other than the leading edge.

In ice protection systems that employ warm air (e.g., bleed air or the like), the control system 118 may include a scoop, air ducts, a ram duct, or the like to supply warm air into tubing, conduits, piping, or the like which is supplied to aircraft flight control elements to warm such elements to prevent ice build up or to cause built up ice to melt and be removed. In electrical and/or electromechanical systems, the connection lines may be electrical connections that supply electrical power and/or signals for operation of electrical heater elements, mechanical actuators, or the like.

In accordance with embodiments of the present disclosure, the control system 118 is an electrical system configured to supply electrical power from the control system 118 to elements installed on the various aircraft flight control elements 108. As shown and described in more detail below, each aircraft flight control elements 108 can include one or more piezoelectric actuators that are integrated into the structure or material of the respective aircraft flight control elements 108. Upon receiving the electrical power, the piezoelectric actuators will be caused to vibrate. As the piezoelectric actuators vibrate, the vibration will be imparted to the material of the aircraft flight control elements 108. The vibrations of the material of the aircraft flight control elements 108 will cause ice to break free of the aircraft flight control elements 108 and thus will be removed.

In comparison to other existing piezoelectric ice protection systems, embodiments of the present disclosure are directed to configurations where the piezoelectric actuators are embedded into the material of the structure to be protected. For example, in some existing ice protection systems, piezoelectric actuators have been bonded to the inside (protected) portion/surface of a component. In the case of leading edges, the geometry and material considerations has led to the piezoelectric actuators from breaking free or separating from the surface and material to which they are bonded. That is, the bonding of existing piezoelectric actuators has led to failures in such systems and thus the use of piezoelectric actuators may not be preferred due to this limitation. However, one of the benefits of embodiments of the present disclosure is that this drawback of the use of piezoelectric actuators may be eliminated, among providing other benefits and features.

In accordance with embodiments of the present disclosure, piezoelectric actuators can be embedded in a composite laminate of the specific component to be ice protected (e.g., laminate structure of the aircraft flight control elements). By embedding the piezoelectric actuators within the material layers or composite laminate of the structure, the piezoelectric actuators can be vibrated within the structure to cause sufficient vibrations to dislodge or break ice that may have formed on an exterior surface of the structure. The selection of various aspects, properties, and characteristics of the structure and the piezoelectric actuators, various vibration mode shapes and/or frequencies can be induced. For example, and without limitation, a selection of the fiber types/stiffness of the composite laminates of the structure, the selection of resins in bonding the composite laminates together and/or bonding the piezoelectric actuators within the layers, the orientations of each ply in the laminate, the type of piezoelectric actuator, the location and/or orientation of the piezoelectric actuator within the laminate, and the like will influence the natural frequencies of the assembly and the modes or shapes that the assembly takes during vibration. In accordance with some embodiments, the piezoelectric actuators may be embedded at a neutral plane of the composite laminate where tensile and compressive stresses are zero under a pure bending load. For symmetric composite laminates, a neutral axis will be at the center of the laminate. A piezoelectric actuator embedded above or below the neutral plane can create bending movement from in-plane tension and compressors forces, or vice versa.

In the construction of the aircraft components, such as aircraft flight control elements, the manufacturing process can include the installation of one or more piezoelectric actuators within the layers of the composite construction. In accordance with some embodiments, the laminate (the structure of the aircraft component) can be manufactured in two separate parts, such as an external layer and an internal layer. In such a configuration, the external layer may be configured to be exposed to the external environment of an aircraft during flight, whereas the internal layer may be contained within the external layer and not exposed to the environment. The two parts (i.e., external layer and internal layer) are bonded together with the piezoelectric actuators in between. In such configurations, the piezoelectric actuators can be pre-wired and/or wiring paths can be made in the laminates directly or on a bonding surface of one or both of the internal and external layers such that the wiring paths may also be sandwiched between the internal and external layers with the piezoelectric actuator(s). In some configurations, stamping can be used to make the separate laminate parts, which is a relatively low cost manufacturing process, and the relatively delicate piezoelectric actuators are not located within in the laminate during layup (i.e., the piezoelectric actuators are arranged between the formed laminates during bonding of the two layers). It will be appreciated that in some manufacturing processes, high temperature and/or pressure processes that would damage the piezoelectric actuator(s), a support or insulating material or structure can be used to protect the piezoelectric actuators. In other manufacturing configurations, for example, the piezoelectric actuator can be added to the laminate during assembly. In such a case, the internal layer and the external layer are simultaneously formed as a single structure. Accordingly, in such process, there is no bond line between the laminate. Such a manufacturing process can result in an aircraft component having an embedded piezoelectric actuator with a higher strength than a two-layer bonded configuration. It will be appreciated by those of skill in the art that the ice protection systems described herein may be manufactured in any variety of processes including, without limitation, the above described processes.

Furthermore, in accordance with some embodiments, if the strength of the piezoelectric actuator is insufficient to be embedded in a laminate, the piezoelectric actuator can be made with holes to allow the laminate to bond through the piezoelectric actuator. Additionally, if additional strength is needed, fibers can be threaded through the holes in the piezoelectric actuator to increase the stress transfer between laminates. If it is desirable that the laminate (i.e., the aircraft component) has holes (e.g., acoustic liner), the piezoelectric actuator can be made with holes that are slightly larger than holes in the laminate so that material of the laminate may bond together through the hole in the piezoelectric actuator. Examples of laminates that may require holes are for acoustic damping and/or noise reduction, such as used on nacelles or for drag reduction.

Figures 2A, 2B:
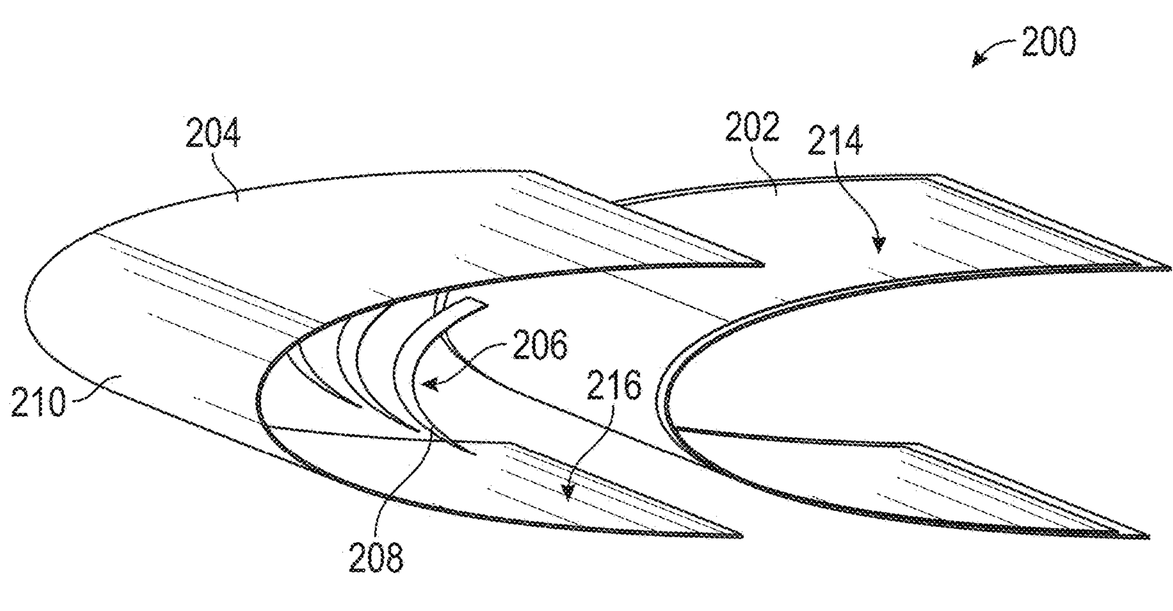
FIG. 2A is a schematic illustration of an aircraft component having an ice protection system in accordance with an embodiment of the present disclosure, as arranged for assembly.
FIG. 2B illustrates the aircraft component and ice protection system of FIG. 2A in an assembled state.

Referring now to FIGS. 2A-2B, schematic illustrations of an aircraft component 200 in accordance with an embodiment of the present disclosure are shown. FIG. 2A illustrates the aircraft component 200 prior to assembly, with the component portions formed and arranged for assembly, and FIG. 2B illustrates the aircraft component 200 as assembled. The aircraft component 200, in some non-limiting examples, may be part of an aircraft wing (e.g., leading edge of an aircraft wing) or a part of an aircraft flight control element (e.g., leading edge of such element). In this illustrative configuration, the aircraft component 200 is formed of two composite layers, having an internal layer 202 and an external layer 204. Each of the internal layer 202 and the external layer 204 may be formed from composite materials that are assembled or manufactured by known means, such as stamping, die-casting, additive manufacturing, layup and curing, or the like. In some embodiments, the material of the internal layer 202 and the external layer 204 may be the same material. In other embodiments, the internal layer 202 and the external layer 204 may be formed of two different materials.

As shown in FIG. 2A, the internal layer 202 and the external layer 204 are arranged to be bonded together with a piezoelectric actuator assembly 206 arranged between the two layers 202, 204. The piezoelectric actuator assembly 206 is formed of one or more piezoelectric actuator elements 208. In this illustrative configuration, the aircraft component 200 includes three piezoelectric actuator elements 208 arranged to be located on and about a leading edge 210 of the aircraft component 200. It will be appreciated that the piezoelectric actuator assembly 206 and/or piezoelectric actuator elements 208 thereof may be arranged at other locations on the aircraft component 200, such as pressure or suction sides (e.g., upward or downward facing surfaces of the external layer 204). Further, although shown with a limited axial length extending aft from the leading edge 210, in other configurations, the piezoelectric actuator elements 208 may extend any distance from the leading edge 210 to a trailing edge 212 of the aircraft component 200.

Figure 3:
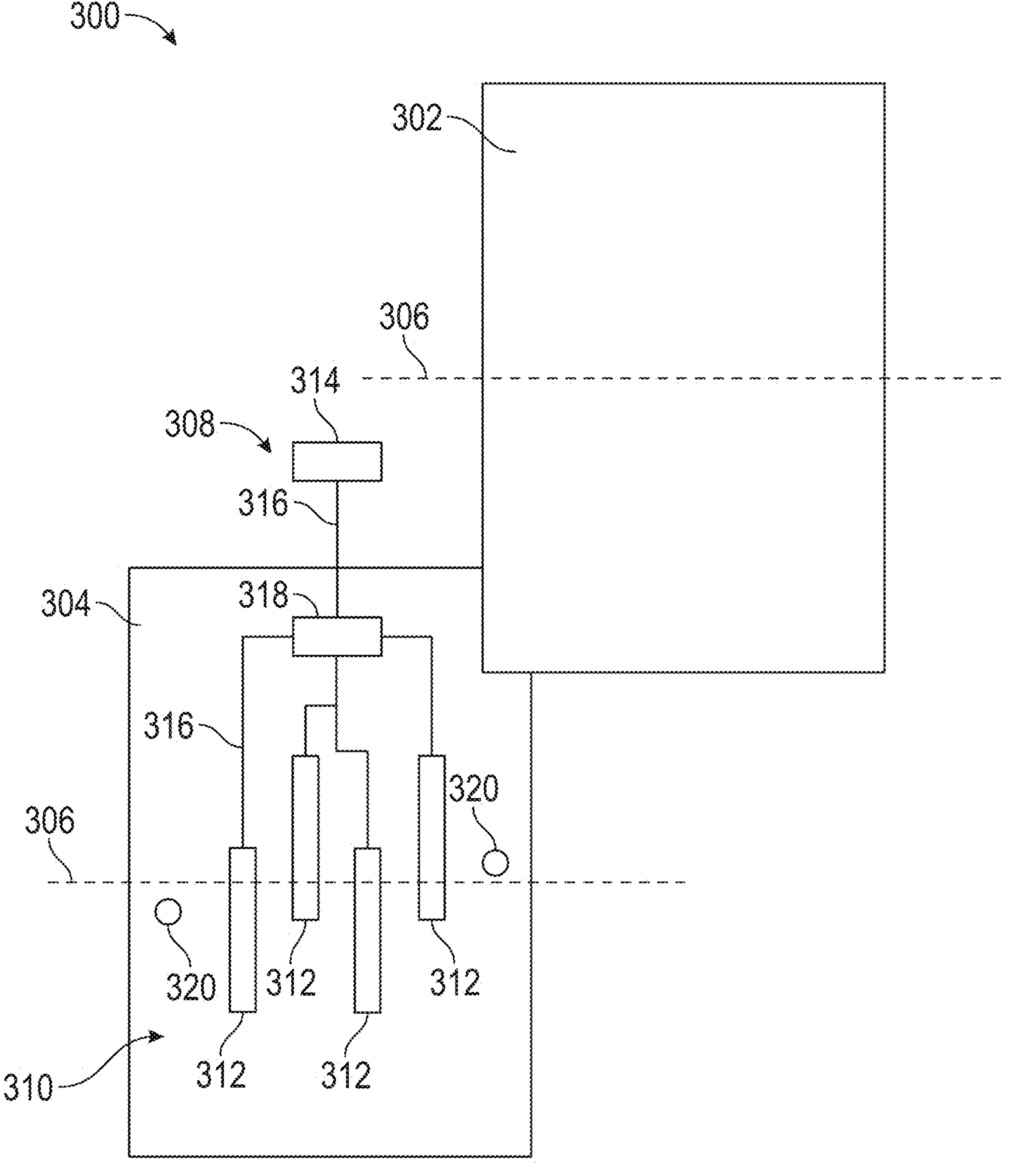
FIG. 3 is a schematic illustration of an assembly of aircraft component and ice protection system in accordance with an embodiment of the present disclosure.

The piezoelectric actuator elements 208 may be electrically connected to a controller, power source, or the like, by electrical wiring or the like (e.g., as shown in FIG. 3) that is also embedded between the internal layer 202 and the external layer 204. In response to a supplied electrical power signal, the piezoelectric actuator elements 208 may be vibrated at one or more frequencies to induce vibration within the structure of the aircraft component 200, particularly at the locations of the piezoelectric actuator elements 208. As the vibration is induced in the material of the aircraft component, any ice that has formed on the external layer 204 will be caused to vibrate and thus break apart or otherwise separate from the external layer 204.

During manufacturing, the internal layer 202 will be bonded to the external layer 204 with the piezoelectric actuator elements 208 of the piezoelectric actuator assembly 206 sandwiched between the internal layer 202 and the external layer 204. A bonding material, such as an adhesive, may be applied to a bonding surface 214 of the internal layer 202 and/or a bonding surface 216 of the external layer 204. The piezoelectric actuator elements 208 may be coated with the bonding material or may be otherwise placed between the bonding surfaces 214, 216 during manufacture and then bonded or secured in place by the bonding of the two layers 202, 204. In other embodiments, where a separate bonding material may not be used, application of heat and/or pressure may be used to cause bonding of the material of the internal layer 202 to the material of the external layer 204. In such an operation, the piezoelectric actuator elements 208 may be placed at desired locations, and then the heat/pressure may be applied to cause bonding between the two layers 202, 204 with the piezoelectric actuator elements 208 secured in place by the bonded material of the two layers 202, 204.

As a result of the manufacturing process and in accordance with embodiments of the present disclosure, the aircraft component 200 will be formed with embedded or internal piezoelectric actuator elements 208 that may be actuated to cause vibrations within the aircraft component 200 to provide ice protection to the aircraft component 200. As used herein, the term embedded, with respect to the piezoelectric actuators 208, refers to a position where the piezoelectric actuator elements 208 are encapsulated or enclosed within material of the aircraft component 200. For example, in the embodiment of FIGS. 2A-2B, the piezoelectric actuator elements 208 are fully encased within and surrounded by the material of the internal layer 202 and the external layer 204, and are not exposed to any external environments, whether external to the external layer 204 or internal to the internal layer 202.

Referring now to FIG. 3, a schematic illustration of a partially assembled aircraft component 300 is shown. The aircraft component 300 may be assembled similar to the process described with respect to FIGS. 2A-2B. For example, as shown, the aircraft component 300 is formed from an internal layer 302 that is bonded to an external layer 304. In this illustration, the layers 302, 304 are shown as flat two-dimensional structures. However, it will be appreciated that the layers 302, 304 may be bent or formed with a curved portion to define a leading edge 306, indicated by a dashed line in FIG. 3.

The aircraft component 300 is configured with an ice protection system 308 that includes an array 310 of piezoelectric actuator elements 312. In this illustrative configuration, the piezoelectric actuator elements 312 of the array 310 are arranged with a staggered or offset orientation relative to each other about the leading edge 306. In other configurations, the piezoelectric actuator elements 312 may be each aligned, such as shown in FIGS. 2A-2B or may be otherwise arranged as appropriate for ice protection of a given aircraft component.

As shown in FIG. 3, each piezoelectric actuator elements 312 is operably and electrically connected to a control system 314. The control system 314 may include a processing controller and a power module. The processing controller may be configured to monitor for ice formation conditions and can control the power module to supply electrical power to the piezoelectric actuator elements 312 through electrical wiring 316. In this illustrative embodiment, a component controller 318 is arranged along the electrical wiring 316 between the control system 314 and the individual piezoelectric actuator elements 312. In operation, the control system 314 may transmit an electrical signal and power to cause each piezoelectric actuator elements 312 to vibrate. The vibrations of the piezoelectric actuator elements 312 will cause the material of the aircraft component 300 to vibrate and thus may prevent ice formation and/or dislodge ice that has formed on the aircraft component. The component controller 318 may be configured to distribute the electrical power/signal from the control system 314 to the individual piezoelectric actuator elements 312. The component controller 318 may, in some embodiments, be configured to condition the electrical power or signal supplied to the piezoelectric actuator elements 312 and/or impart a waveform to induce a specific pattern or vibration frequency at the piezoelectric actuator elements 312. In other embodiments, the component controller 318 may be omitted and the functions thereof may be incorporated into the control system 314.

The control system 314 may be in communication with one or more ice detection sensors 320 that are located on the aircraft component 300. The ice detection sensors 320 may be arranged in communication with the control system 314 by wired or wireless means, as will be appreciated by those of skill in the art. Upon detection of ice formation or ice formation conditions (e.g., temperature, ambient air water content, altitude, etc.), the control system 314 may be operated to cause actuation of the piezoelectric actuator elements 312 to dislodge formed ice or to prevent ice formation by inducing vibrations in the material of the aircraft component 300. It will be appreciated that the electrical wiring 316, control system 314, and ice detection sensors 320 may be implemented in various configurations, such as the embodiment shown in FIGS. 2A-2B and/or other embodiments described herein or otherwise encompassed by embodiments of the present disclosure.

Figure 4:
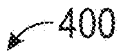
FIG. 4 is an example configuration of an aircraft component and ice protection system in accordance with an embodiment of the present disclosure.
Figure 4:
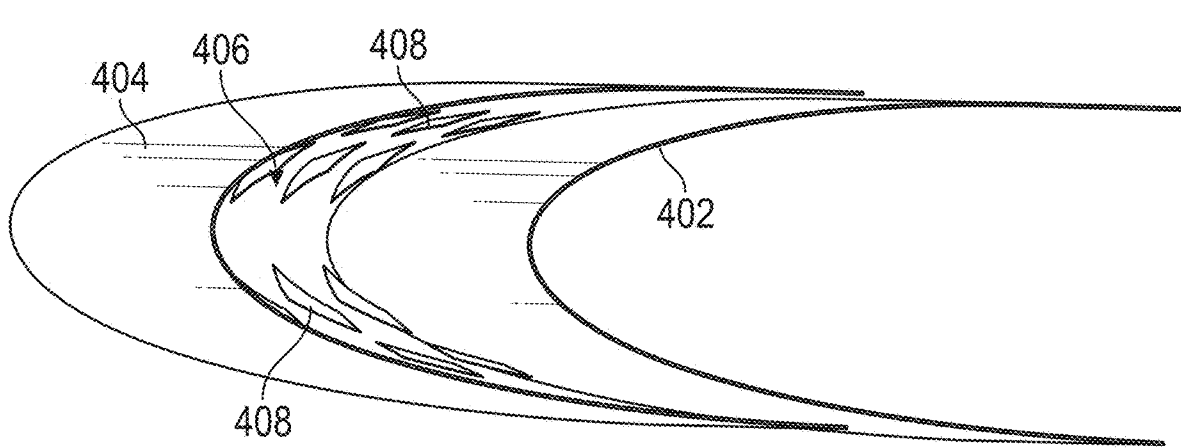

Referring now to FIG. 4, a schematic illustration of an aircraft component 400 in accordance with an embodiment of the present disclosure is shown. The aircraft component 400 may be similar to that shown and described above, including an internal layer 402, and external layer 404, and an array 406 of piezoelectric actuator elements 408. The internal layer 402 may be bonded or otherwise joined with the external layer 404 with the array 406 disposed therebetween, such that the piezoelectric actuator elements 408 are embedded within the formed aircraft component 400. In this configuration, the piezoelectric actuator elements 408 are discrete elements, in this embodiment in diamond shape. The piezoelectric actuator elements 408 may individually be connected to a control system or may be collectively connected to the control system through a component controller, as described above. Electrical wiring and the controllers are omitted for clarity, but those of skill in the art will appreciate that the process/configuration described with respect to FIG. 3 may be employed with the aircraft component 400. Each piezoelectric actuator element 408, in this embodiment, is completely surrounded by material of the layers 402, 404 and/or bonding material used to bond the two layers 402, 404 together. It will be appreciated that the geometric shapes of the piezoelectric actuator elements 408 may be different than that shown. As noted, the illustrated configuration is generally diamond in shape. However, in other embodiments, any polygonal shape (e.g., squares, rectangles, trapezoids, polygons, etc.), circles, ovals, or other geometric shapes or non-geometric shapes may be employed for the piezoelectric actuators in accordance with embodiments of the present disclosure.

Figure 5:
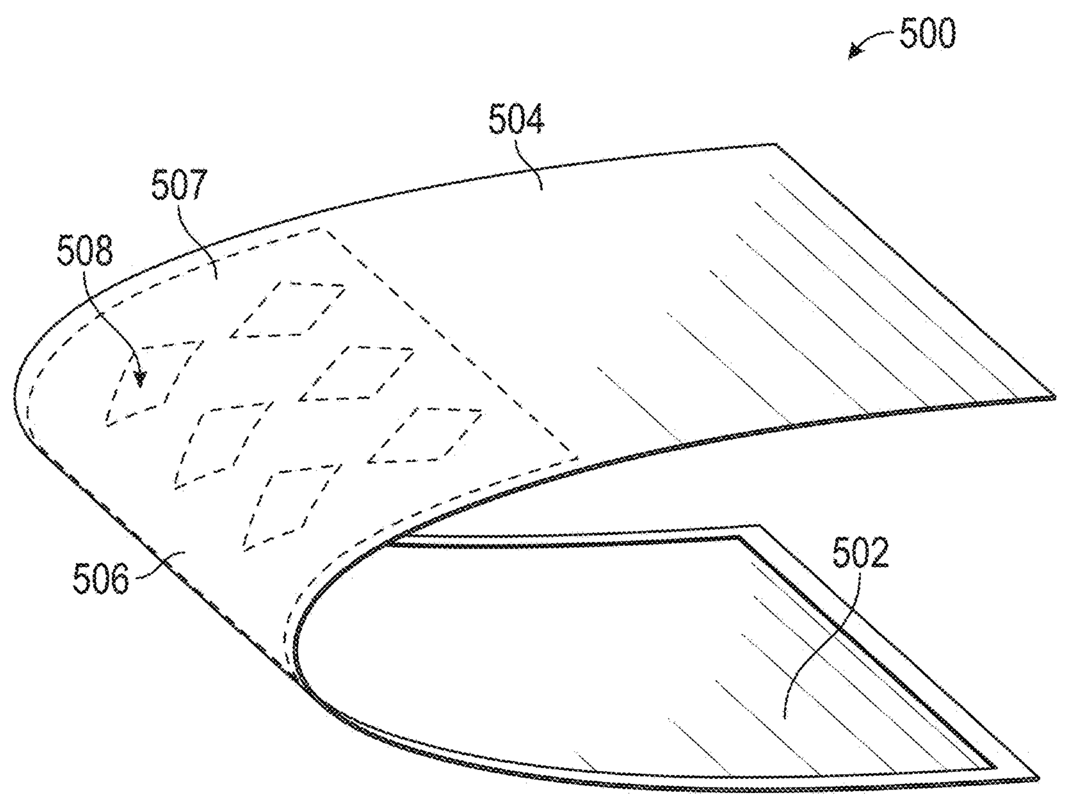
FIG. 5 is another example configuration of an aircraft component and ice protection system in accordance with an embodiment of the present disclosure.

Referring now to FIG. 5, a schematic illustration of an aircraft component 500 in accordance with an embodiment of the present disclosure is shown. The aircraft component 500 may be similar to that shown and described above, including an internal layer 502, and external layer 504, and a piezoelectric actuator element 506. The internal layer 502 may be bonded or otherwise joined with the external layer 504 with the piezoelectric actuator element 506 disposed therebetween, such that the piezoelectric actuator element 506 is embedded within the formed aircraft component 500. In this configuration, the piezoelectric actuator element 506 is arranged as a matrix or sheet configuration. The matrix of the piezoelectric actuator element 506 includes an encapsulating protective layer 507 with elements 508 embedded therein. The matrix layer configuration may reduce the complexity of arranging or placing the piezoelectric actuator element 506 between the layers 502, 504. Further, in such configurations, the protective layer 507 may be configured to enhance or aid in the bonding or securing of the piezoelectric actuator element 506 between and to the layers 502, 504.

Figures 6, 7:
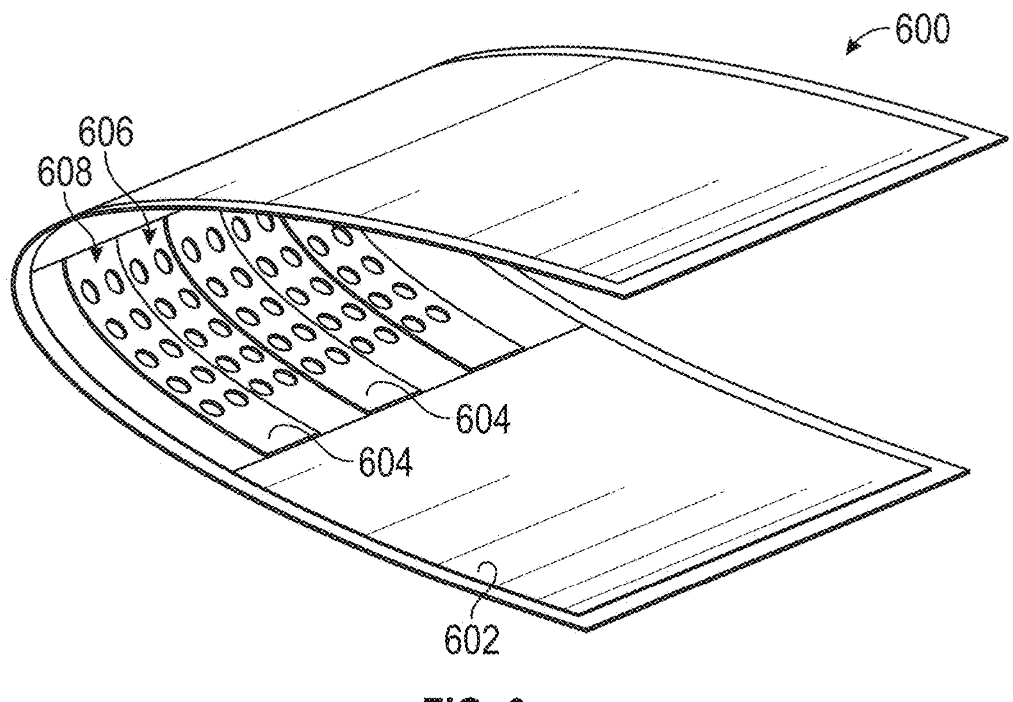
FIG. 6 is another example configuration of an aircraft component and ice protection system in accordance with an embodiment of the present disclosure.
FIG. 7 is a plan view illustration of part of an assembly with an ice protection system in accordance with an embodiment of the present disclosure.

Referring now to FIG. 6, a schematic illustration of an aircraft component 600 in accordance with an embodiment of the present disclosure is shown. The aircraft component 600 may be similar to that shown and described above, including a layer 602 and a set of a piezoelectric actuator elements 604. In this configuration, the aircraft component 600 includes an array of holes 606, which may be provided for acoustic damping, noise reduction, drag reduction, or the like. The holes 606 may be intended to be through-holes such that air may pass therethrough. Accordingly, the piezoelectric actuator elements 604 have a respective array of holes 608 which are arranged to align with the holes 606 of the aircraft component 600. In this embodiment, the piezoelectric actuator elements 604 may be bonded to the layer 602 or may be secured between two layers, as shown and described above. In this configuration, the holes 606 of the aircraft component 600 and the holes 608 of the piezoelectric actuator elements 604 are substantially the same size.

Referring now to FIG. 7, a schematic illustration of an aircraft component 700 in accordance with an embodiment of the present disclosure is shown. The aircraft component 700 may be similar to that shown and described above, including an internal layer 702, and external layer 704, and a set of piezoelectric actuator elements 706. The internal layer 702 may be bonded or otherwise joined with the external layer 704 with the piezoelectric actuator elements 706 disposed therebetween, such that the piezoelectric actuator elements 706 are embedded within the formed aircraft component 700. In other embodiments, as described above, rather than being sandwiched between two bonded layers 702, 704, in some embodiments the two layers 702, 704 may represent a single unitary structure that was integrally formed in a single process, with the piezoelectric actuator elements 706 embedded in the material during the manufacturing process. In such configurations, the term internal layer refers to the inner side/surface of the aircraft component 700 and the external layer refers to the external side/surface of the aircraft component 700.

In this configuration, the piezoelectric actuator elements 706 are shown electrically connected to a control system 708 by electrical wiring 710. The aircraft component 700, in this embodiment, also includes other optional features. For example, as shown, ice detection sensors 712 may be positioned on surfaces (e.g., external surface) of the aircraft component 700. The ice detection sensors 712 may be connected to the control system 708 by wiring (not shown) or by a wireless connection. Additionally, in this illustrative configuration, the ice protection system is supplemented with optional heater elements 714 and/or an anti-ice or low ice adhesive coating 716. The optional heater elements 714 may be installed within the aircraft component 700 or may be applied to an external or internal surface thereof, as will be appreciated by those of skill in the art. Similarly, the low ice adhesive coating 716 may be applied prior to or after installation of the aircraft component 700 to the aircraft.

In accordance with some non-limiting embodiments, the heater elements 714 may be thermal devices that generate and supply heat to the material of the aircraft component 700. The heater elements 714 may be electrically connected to and controlled by the control system 708 through electrical wiring 710. The heater elements 714, in some configurations, may be configured to receive heated air from other onboard sources of the aircraft, as will be appreciated by those of skill in the art. In accordance with some non-limiting embodiments, the low ice adhesive coating 716 may be a coating having hydrophobic properties that may change the ability of ice to form or stick to the external surface of the aircraft component 700 by means of chemical and/or topographic operation. The heater elements 714 and/or the low ice adhesive coating 716 may be used to supplement or augment the ice protection provided by the piezoelectric actuator elements 706. For example, because the piezoelectric actuator elements 706 operate by inducing a vibration within the material of the aircraft component 700, the application of heat or providing an anti-ice coating may cause ice to more rapidly separate and be removed from the aircraft component 700. In another non-limiting configuration, the low ice adhesive coating 716 may be a coating that reduces the adhesion force between ice and the external surface of the aircraft component 700. The use of the low ice adhesive coating 716 may reduce the amount of power needed to operate the piezoelectric actuator elements 706 to cause ice to separate from the surfaces of the aircraft component 700.

The ice detection sensors 712 may be sensors configured to detect the presence of ice and/or conditions in which ice may form. In some configurations, the ice detection sensors 712 are arranged to measure a thickness or amount of ice that is formed on the aircraft component 700. Upon detecting a threshold amount or thickness of ice, the piezoelectric actuator elements 706 and/or the heater elements 714 may be operated to remove the formed ice. In other configurations, the ice detection sensors 712 may be configured to detect the conditions for ice formation and thus trigger operation and actuation of the piezoelectric actuator elements 706 and/or the heater elements 714. It will be appreciated that a low ice adhesive coating 716 may provide a passive assistance to prevent ice formation and/or accumulation. In accordance with some embodiments, the ice detection sensors 712 may be configured to monitor external, ambient, and/or environmental conditions (e.g., temperature, moisture content) and/or temperatures of the aircraft component 700, or combinations thereof. When conditions for ice formation are present or close to existing, depending on the thresholds set at the control system 708, the control system 708 may cause operation of the piezoelectric actuator elements 706 and/or the heater elements 714 to prevent the formation of ice on the aircraft component 700. Further, it will be appreciated that multiple different types of sensors (e.g., ice thickness sensors and environmental condition sensors) may be used without departing from the scope of the present disclosure.

Figure 8A:
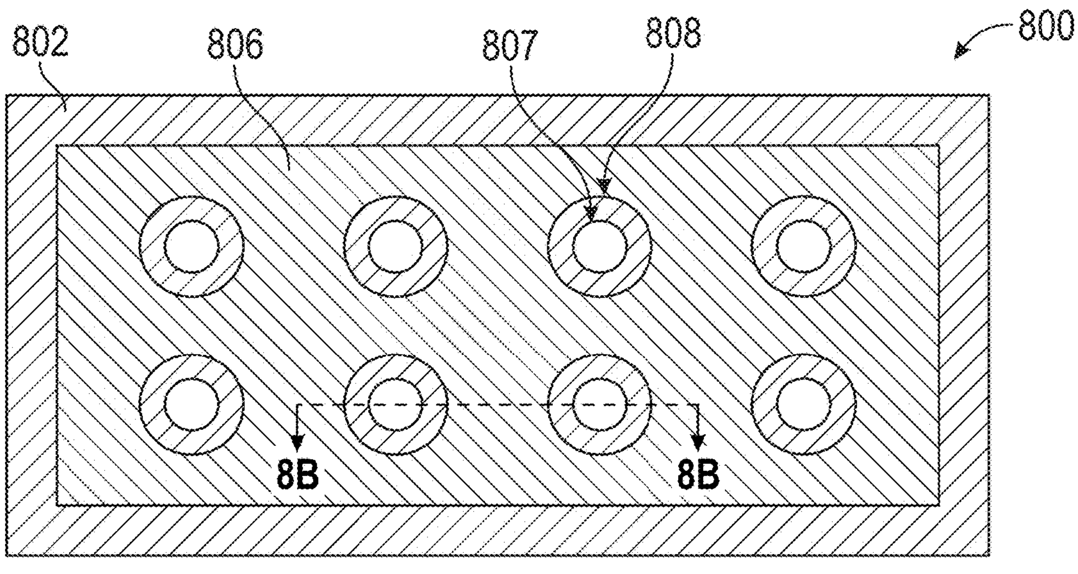
FIG. 8A is a plan view illustration of part of an assembly with an ice protection system in accordance with an embodiment of the present disclosure.
Figure 8B:
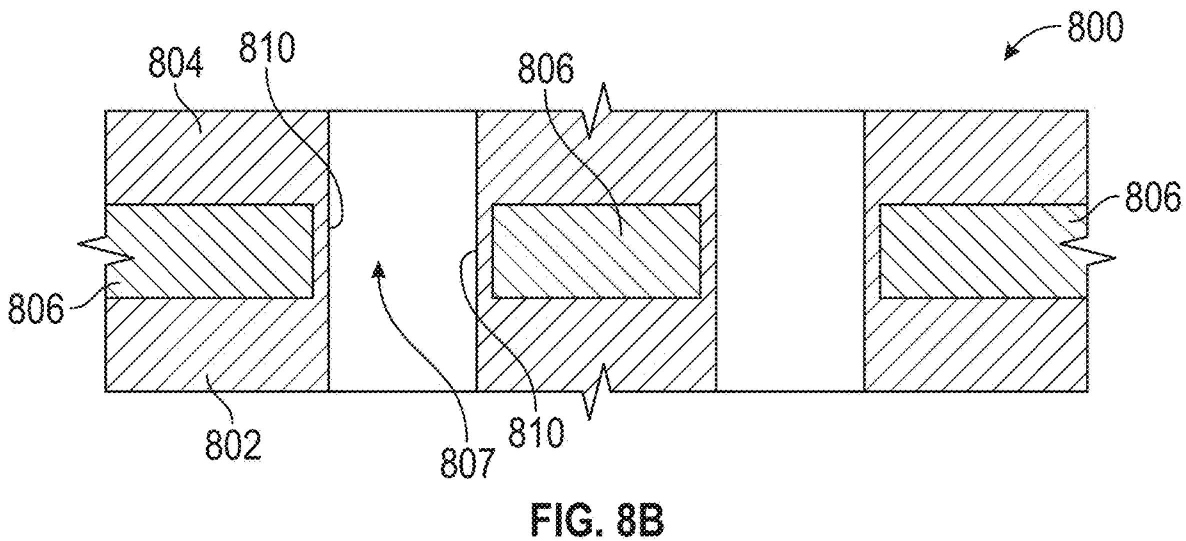
FIG. 8B is a cross-sectional view of the assembly of FIG. 8A viewed along the line B-B of FIG. 8A.

Referring to FIGS. 8A-8B, schematic illustrations of a part of an aircraft component 800 in accordance with an embodiment of the present disclosure are shown. The aircraft component 800 may be similar to that shown and described above, including a first layer 802, a second layer 804, and a piezoelectric actuator element 806. The configuration of FIGS. 8A-8B is similar to that of FIG. 6, but in this configuration holes 807 of the aircraft component 800 are smaller than holes 808 of the piezoelectric actuator element 806. As a result, bonding between the two layers 802, 804, as shown in FIG. 8B, may be achieved at the area around the holes 807 of the aircraft component 800, ensuring a complete bond between the layers and to fully enclose the structure of the piezoelectric actuator element 804 and seal it from the environment. FIG. 8B is a cross-sectional illustration of a portion of the aircraft component 800 viewed along the line B-B shown in FIG. 8A. As illustrated in the cross-sectional view, material 810 of the layers 802, 804 may join or bond together thus sealing the material of the piezoelectric actuator element 806 within the material of the aircraft component 800. The aircraft component 800 includes through holes in addition to incorporating the piezoelectric actuator element 806. It will be appreciated that in other configurations, the holes 807 of the aircraft component 800 may be solid/filled in and completely enclose the piezoelectric actuator element 806 with no open holes or spaces, but rather the holes 808 of the piezoelectric actuator element 806 may be filled with material of the layers 802, 804.

Figure 9A:
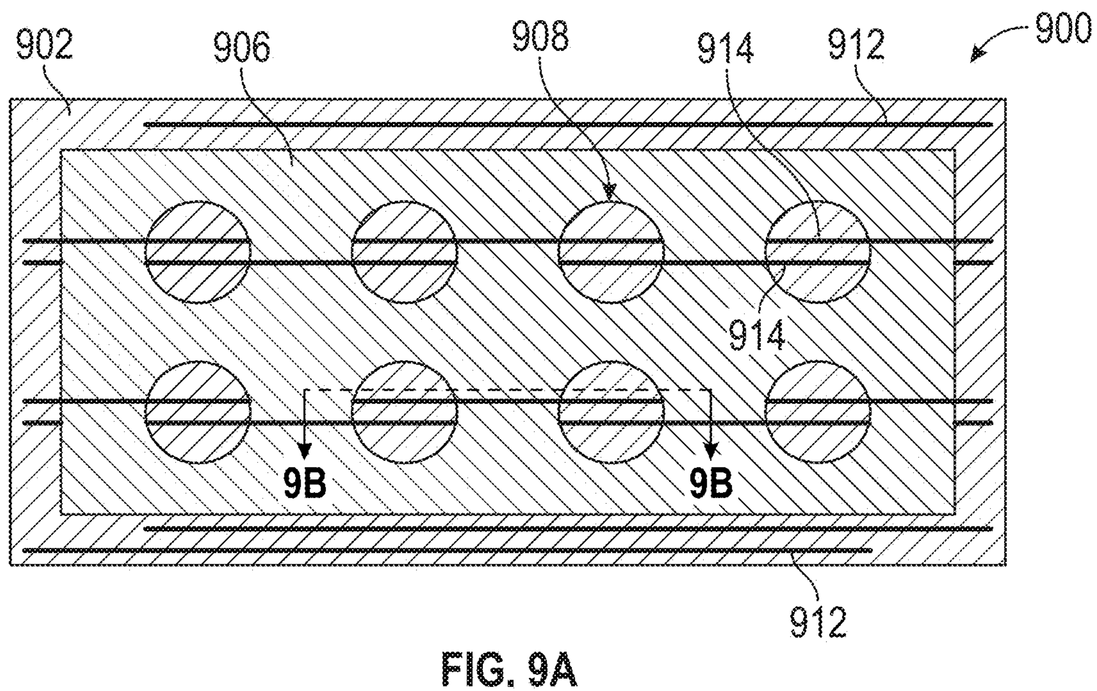
FIG. 9A is a plan view illustration of part of another assembly with an ice protection system in accordance with an embodiment of the present disclosure.
Figure 9B:
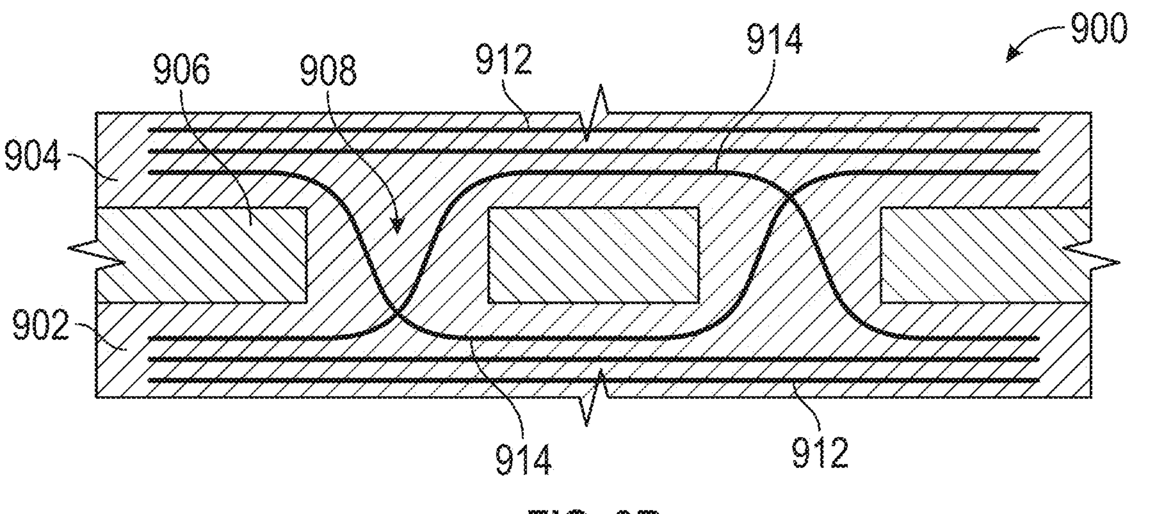
FIG. 9B is a cross-sectional view of the assembly of FIG. 9A viewed along the line B-B of FIG. 9A.

Referring to FIGS. 9A-9B, schematic illustrations of a part of an aircraft component 900 in accordance with an embodiment of the present disclosure are shown. The aircraft component 900 may be similar to that shown and described above, including a first layer 902, a second layer 904, and a piezoelectric actuator element 906. The configuration of FIGS. 9A-9B is similar to that of FIG. 6, with holes 908 of the aircraft component 900 and the piezoelectric actuator element 906 being similar in size. In this non-limiting embodiment, the layers 902, 904 of the aircraft component 900 include embedded fibers 912, 914. A first set of fibers 912 are embedded directly within the material of the layers 902, 904. A second set of fibers 914 are threaded through the holes 908 and are embedded in both layers 902, 904, winding from one layer 902, 904 to the other layer 902, 904 through the holes 908. The fibers 914 can provide bonding and securing of the piezoelectric actuator element 906 between the layers 902, 904 of the aircraft component 900. As a result, bonding between the two layers 902, 904 may be achieved through the holes 908 of the aircraft component 900, ensuring a complete bond between the layers 902, 904 and to fully enclose the structure of the piezoelectric actuator element 906. It will be appreciated that the fibers of the second set of fibers 914 can interact with the fibers of the first set of fibers 912 (e.g., be wound together, continuations thereof, or otherwise interact). Furthermore, in some configurations, the weaving pattern of the fibers of the second set of fibers 914 may be arranged in different configurations, such as in multiple directions, crossing, woven together, or the like. It will be appreciated that the hole configuration of FIGS. 8A-8B may be combined with the fiber configuration of FIGS. 9A-9B, and/or the fiber configuration may be employed in any of the above described embodiments.

With respect to the embodiments of FIGS. 4-9B, the piezoelectric actuator elements can be made with holes to allow laminates (or layers) to bond through the holes of the piezoelectric actuator element. Additionally, if additional strength is needed, fibers can be threaded through the holes in the layers of the aircraft component and/or the piezoelectric actuator to increase the stress transfer between laminates. If it is desirable that the laminate (i.e., the aircraft component) has holes (e.g., acoustic liner), the piezoelectric actuator can be made with holes that are slightly larger than the holes in the aircraft component so that material of the laminate layers may bond together through the hole(s) in the piezoelectric actuator element. In the embodiments illustratively shown in FIGS. 4-9B, certain features are illustratively omitted, such as wiring and control elements. It will be appreciated that the various embodiments would include such components, such as shown and described with respect to FIG. 3. As such, it is not intended to imply that these embodiments do not contain such features, but rather only that which is described is illustrated for simplicity and clarity of discussion.

Figure 10:
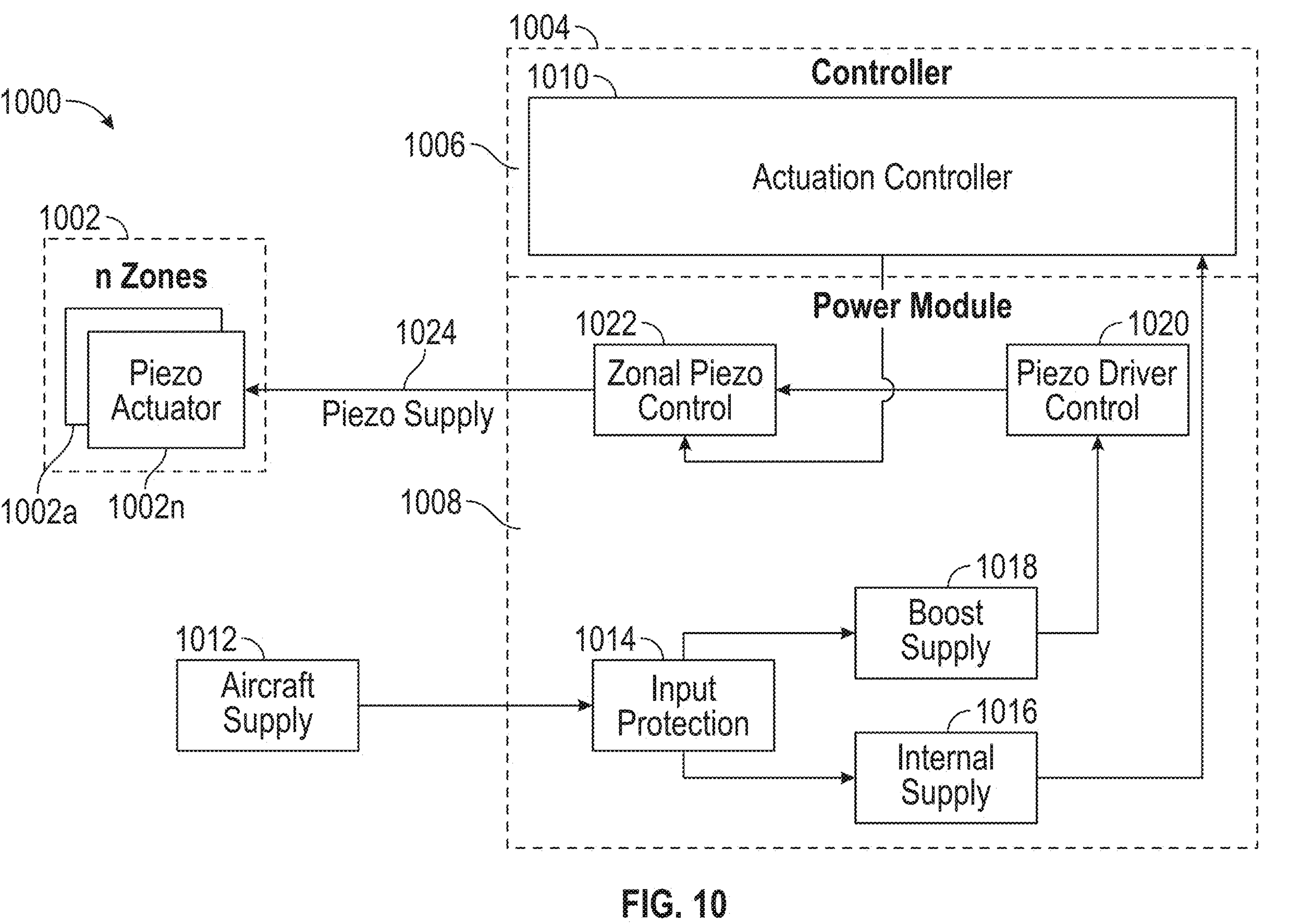
FIG. 10 is a schematic diagram of components and electrical connections of an ice protection system in accordance with an embodiment of the present disclosure.

Referring now to FIG. 10, a schematic diagram of an ice protection system 1000 in accordance with an embodiment of the present disclosure is shown. The ice protection system 1000 includes a set of zones 1002 (e.g., n zones), with each zone having a respective piezoelectric actuator element 1002*a, b, . . . , n* (e.g., individual elements, sheets, arrays, etc., such as shown and described above). Each piezoelectric actuator element 1002*a, b, . . . , n* may be associated with a specific aircraft flight control element and/or part of an aircraft (e.g., wing surface, fuselage surface, nacelle, etc.), or some portion thereof. The piezoelectric actuator elements 1002*a, b, . . . , n* illustrated in FIG. 10 may represent a single piezoelectric actuator element or a collection/set of piezoelectric actuator elements, such as the various embodiments shown and described above. The piezoelectric actuator elements 1002*a, b, . . . , n* are electrically connected to a control system 1004, which is configured to provide commands and/or electrical power to the piezoelectric actuator elements 1002*a, b, . . . , n*.

The control system 1004, as shown, includes a controller 1006 and a power module 1008. In some embodiments, the controller 1006 and the power module 1008 may be parts of a single control system or module, whereas in other embodiments, the controller 1006 and the power module 1008 may be physically separated. The controller 1006 is configured to receive data from sensors (e.g., ice detection sensors) and to control actuation and operation of the piezoelectric actuator elements 1002*a, b, . . . , n*. The power module 1008 is configured to supply electrical power to the piezoelectric actuator elements 1002*a, b, . . . , n*. The controller 1006 may include various electrical and electronic components for data and signal communication and processing, command generation, and the like. As such, and without limitation, the controller 1006 may include processors, input/output devices or components, memory, and the like. As shown, the controller 1006 includes an actuation controller 1010, which may be a program, application, or software module installed on the controller 1006. The actuation controller 1010 may be configured to send operational instructions from the controller 1006 to the power module 1008 to cause a supply of electrical power to be transmitted to one or more of the piezoelectric actuator elements 1002*a, b, . . . , n*. The operational commands can include, for example and without limitation, instructions for amount and duration of time for supply of power to the piezoelectric actuator elements 1002*a, b, . . . , n*, frequency information regarding the vibrations to be induced, or the like.

The power module 1008 of the system controller 1004 is configured to receive power from an aircraft power supply 1012. The aircraft power supply 1012 may be a battery, an auxiliary power unit, power supplied by an engine, an onboard generator, or the like. In some embodiment, the aircraft power supply 1012 may provide power as 28 V DC to 800 V DC or 110 V AC to 240 V AC. Because such high levels of electrical power may not be necessary, the power module 1008 includes an input protection module 1014. The input protection module 1014 may condition or otherwise modify the incoming power for use by the ice protection system 1000. For example, the input protection module 1014 may be configured to provide electrical protection from surges or other electromagnetic interference (EMI) and/or electromagnetic compatibility (EMC) related issues.

After conditioning the input electrical supply at the input protection module 1014, a portion of the electrical power will be provided to an internal supply 1016 which provides power to the components of the control system 1004 (e.g., components of both the controller 1006 and the power module 1008). Another portion of the incoming and conditioned power from the aircraft power supply 1012 is provided to a boost module 1018. The boost module 1018 may be provided to boost the incoming electrical power. For example, the boost module 1018 may increase the voltage of the electrical power to 200 V to up to 1,500 V or greater. The boost module 1018 may also provide short and/or overload protection for the system. The boosted power is supplied to a driver module 1020. The driver module 1020 is configured to provide configured and/or timed input for actuating the piezoelectric actuator elements 1002*a, b, . . . , n*. The inputs may be on a zonal basis either dynamically (e.g., depending on ongoing demand with varying resonant frequencies and/or voltage gains, etc.) or in a predetermined fashion. The output from the driver module 1020 is passed through a zonal control module 1022 which is configured to direct electrical power to one or more of the zones 1002 and the piezoelectric actuator elements 1002*a, b, . . . , n*, thereof along electrical wiring 1024. The electrical wiring 1024 may be configured with conventional wiring and flat wires or electrical connections which may be embedded within material of aircraft components, as described above.

In operation, the control system 1004 is configured to transmit or send electrical power to the piezoelectric actuator elements 1002*a, b, . . . , n*, in one or more of the zones 1002. The power may be transmitted for a predetermined duration of time, in pulses over a time period, or the like. In some embodiments, the power output from the control system 1004 may be selected to cause the respective piezoelectric actuator elements 1002*a, b, . . . , n*, to vibrate at predetermined frequencies. The input power may be used to modify a resonant mode frequency or may be offset from neutral to cause vibrations in the piezoelectric actuator elements 1002*a, b, . . . , n*, and thus vibrations in the material of the aircraft components. In some embodiments, the power received at the piezoelectric actuator elements 1002*a, b, . . . , n*, may cause a constant vibration of a specific frequency. In other embodiments, the control system 1004 may be configured to drive the vibrations of the piezoelectric actuator elements 1002*a, b, . . . , n*, through a range of frequencies, such as in a sweep operation. The range of frequencies to be employed, whether singular or in a sweep manner, may be, for example, and without limitation, between 10 Hz and 60 kHz. In a single frequency operation, for example, the activation may be set at 20 kHz to 60 kHz. In a sweeping frequency operation, the range of frequencies may be 10 Hz to 5,000 Hz. Various other single value frequencies and/or sweep ranges may be employed without departing from the scope of the present disclosure.

Advantageously, embodiments of the present disclosure provide for aircraft ice prevention systems having embedded piezoelectric actuator elements within aircraft components. In accordance with embodiments, the piezoelectric actuator elements may be embedded within the material of the aircraft component (e.g., between layers or completely surrounded and within material of the component). In some configurations, the piezoelectric actuator elements may be embedded at a leading edge portion of the aircraft component (e.g., a wing structure, a flight control element structure, or the like). In some embodiments, while being embedded within the material, the piezoelectric actuator elements may include holes to allow for material of the component to bond through the holes and/or to allow for holes in the component to not be obstructed/blocked by the piezoelectric actuator elements. Advantageously, embodiments of the present disclosure provide for improved durability of the piezoelectric actuator elements because they are embedded within the material of the component and thus protected. This is in contrast to prior piezoelectric actuator element configurations that arranged and bonded the piezoelectric actuator elements on an internal surface of the component. Such arrangement could lead to separation, damage, or failure, and such may be avoided by implementing configurations as described herein.

Furthermore, advantageously, because the piezoelectric actuator elements are embedded in the material of the component, ice protection may be implemented is a wide range of aircraft components (e.g., wings, flight control surfaces/elements, nacelles, and the like). Additionally, such embedding of piezoelectric actuator elements for ice protection can lead to weight reductions, reduced maintenance costs and efforts (e.g., no need to ensure the piezoelectric actuator elements have not separated from the component surface), and can be used for all aircraft platforms and surfaces thereof.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An aircraft ice protection system comprising:

an aircraft component having an internal layer and an external layer;

a piezoelectric actuator element embedded within the aircraft component between material of the internal layer and the external layer; and a control system operably connected to the piezoelectric actuator element and configured to drive actuation of the piezoelectric actuator element to at least one of remove ice formed on the aircraft component and prevent the formation of ice on the aircraft component, wherein the piezoelectric actuator element comprises a hole and wherein material of the internal layer and material of the external layer are bonded together through the hole.

2. The aircraft ice protection system of claim 1, wherein the piezoelectric actuator element is part of an array of piezoelectric actuator elements embedded within the aircraft component.

3. The aircraft ice protection system of claim 1, wherein the aircraft component comprises a hole and the hole of the piezoelectric actuator element and the hole of the aircraft component are aligned.

4. The aircraft ice protection system of claim 3, wherein the hole of the piezoelectric actuator element is larger than the hole of the aircraft component.

5. The aircraft ice protection system of claim 4, wherein material of the internal layer and material of the external layer are bonded together around the hole in the piezoelectric actuator element.

6. The aircraft ice protection system of claim 5, wherein the predetermined frequency operation comprises supplying power to the piezoelectric actuator element having a frequency of between 20 kHz and 60 kHz.

7. The aircraft ice protection system of claim 1, further comprising at least one ice detection sensor associated with the aircraft component, wherein the control system is configured to cause actuation of the piezoelectric actuator element in response to information received from the at least one ice detection sensor.

8. The aircraft ice protection system of claim 7, wherein the control system comprises a controller and a power module.

9. The aircraft ice protection system of claim 8, wherein the controller is configured to control actuation of the piezoelectric actuator element by controlling the power module to send electrical power to the piezoelectric actuator element.

10. The aircraft ice protection system of claim 9, wherein a supply of power from the power module to the piezoelectric actuator element is set to a predetermined frequency operation to induce vibrations in the piezoelectric actuator element.

11. The aircraft ice protection system of claim 8, wherein the power module comprises an input protection module and a boost module, wherein the input protection module and the boost module are configured to condition an input of electrical power received from an aircraft power supply.

12. The aircraft ice protection system of claim 11, wherein the input electrical power is 28 V DC to 800 V DC or 110

V AC to 240 V AC and the power module is configured to boost a voltage of the electrical power to between 200 V and 1,500 V.

13. The aircraft ice protection system of claim 1, further comprising one or both of (i) a heater element arranged in or on the aircraft component and (ii) a low ice adhesion coating or surface modification applied to the external layer of the aircraft component.

14. The aircraft ice protection system of claim 1, wherein the aircraft component is a first aircraft component and the piezoelectric actuator element is a first piezoelectric actuator element associated with the first aircraft component, the aircraft ice protection system further comprising:

a second aircraft component having an associated second piezoelectric actuator element embedded within the second aircraft component.

15. The aircraft ice protection system of claim 14, wherein the control system is configured to selectively control actuation of the first piezoelectric actuator element and the second piezoelectric actuator element.

16. The aircraft ice protection system of claim 1, wherein the control system is configured to drive operation of the piezoelectric actuator element for a predetermined amount of time.

17. A method of aircraft ice protection comprising:

embedding a piezoelectric actuator element within an aircraft component, wherein the aircraft component comprises an internal layer and an external layer and the piezoelectric actuator element is embedded between material of the internal layer and the external layer, wherein the piezoelectric actuator element comprises a hole and wherein material of the internal layer and material of the external layer are bonded together through the hole;

detecting an ice formation condition associated with the aircraft component; and driving actuation of the piezoelectric actuator element to induce vibrations within the aircraft component.

18. The method of claim 17, wherein embedding the piezoelectric actuator element within the aircraft component comprises:

forming a structure of the internal layer;

forming a structure of the external layer;

arranging the piezoelectric actuator element between the structure of the internal layer and the structure of the external layer; and bonding material of the internal layer to material of the external layer, with the piezoelectric actuator element embedded within and between material of the internal layer and the external layer.

19. The method of claim 17, wherein embedding the piezoelectric actuator element within the aircraft component comprises:

forming the internal layer and the external layer as a unitary structure with the piezoelectric actuator element disposed within the material of the unitary structure.

20. An aircraft ice protection system comprising:

an aircraft component having an internal layer and an external layer;

a piezoelectric actuator element embedded within the aircraft component between material of the internal layer and the external layer; and a control system operably connected to the piezoelectric actuator element and configured to drive actuation of the piezoelectric actuator element to at least one of remove ice formed on the aircraft component and prevent the formation of ice on the aircraft component, wherein the piezoelectric actuator element comprises a hole and the aircraft component comprises a hole, wherein the hole of the piezoelectric actuator element and the hole of the aircraft component are aligned.

* * * * *